United States Patent [19]
Edlinger

[11] Patent Number: 5,501,721
[45] Date of Patent: Mar. 26, 1996

[54] PROCESS FOR PRODUCING PIG IRON AND CEMENT CLINKER

[75] Inventor: Alfred Edlinger, Baden, Switzerland

[73] Assignee: Holderbank Financiere Glarus AG, Glarus, Switzerland

[21] Appl. No.: 307,615

[22] PCT Filed: Jan. 26, 1994

[86] PCT No.: PCT/AT94/00007

§ 371 Date: Sep. 20, 1994

§ 102(e) Date: Sep. 20, 1994

[87] PCT Pub. No.: WO94/17214

PCT Pub. Date: Aug. 4, 1994

[30] Foreign Application Priority Data

Jan. 26, 1993 [AT] Austria ................. 125/93

[51] Int. Cl.$^6$ ..................... C21B 11/00
[52] U.S. Cl. ..................... 75/434; 588/207
[58] Field of Search ................. 75/434; 588/207

[56] References Cited

U.S. PATENT DOCUMENTS

| | | |
|---|---|---|
| 1,842,609 | 1/1932 | Hillhause . |
| 3,052,534 | 9/1962 | Bosley . |
| 3,721,548 | 3/1973 | Hodge . |
| 4,063,930 | 12/1977 | Kusner . |
| 4,937,065 | 6/1990 | Maurer et al. ............ 588/207 |
| 5,364,446 | 11/1994 | Batterham et al. ........ 75/434 |

FOREIGN PATENT DOCUMENTS 179734  4/1986  European Pat. Off. .

Primary Examiner—Melvyn Andrews
Attorney, Agent, or Firm—Cushman Darby & Cushman

[57] ABSTRACT

In a process for the preparation of pig iron and cement clinker in a fusion gasifier (3) in which the charge is at least partly preheated and possibly deacidified and subjected to preliminary reduction or is used in the form of scrap, coal is blown into a fluidized bed (7) and gasified with the reduction of the charge and pig iron (8) and slag (9) are tapped off in liquid form, the procedure is such that the lime charge introduced into the fusion gasifier (3), possibly together with a portion of an iron ore, is preheated in a preheating shaft (1) and calcined and charged according to the clinker composition required.

15 Claims, 1 Drawing Sheet

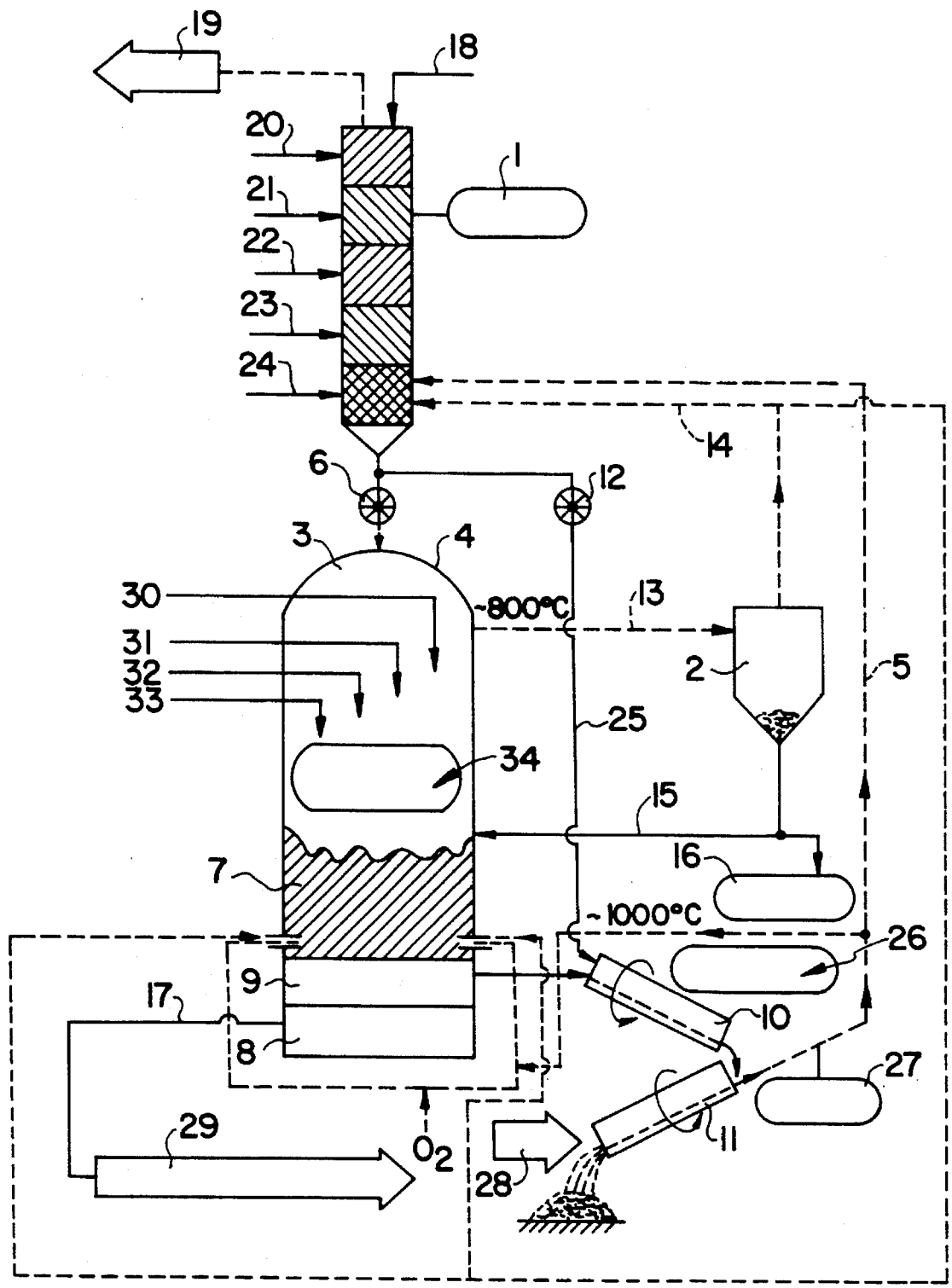

PROCESS FOR PRODUCING PIG IRON AND CEMENT CLINKER

BACKGROUND OF THE INVENTION

1. Field of the Invention

The invention relates to a process for the preparation of pig iron and cement clinker in a fusion gasifier in which the charge is at least partially preheated, possibly deacidified and subjected to preliminary reduction or is used in the form of scrap, coal is blown into a fluidized bed and gasified with a reduction of the charge and pig iron and slag are drawn off in liquid form.

BACKGROUND OF RELATED ART

Processes for the preparation of pig iron in a fusion gasifier are normally optimized with regard to the required yield of pig iron, while at the same time in most conventional processes the economy is calculated by an appropriately high-quality product gas at the gasifier head. In such known processes the slag is selected with regard to the removal of contaminants from the pig iron bath, and, taking into account at the same time the energy utilization of the product gas without corresponding requirements being made of the quality of the iron bath, a slag bath which by no means fulfils satisfactory conditions as cement clinker is as a rule obtained.

SUMMARY OF THE INVENTION

The object of the invention is now to develop further a process of the aforementioned type so that pig iron and cement clinker can be directly produced in a fusion gasifier and that a series of contaminants can be safely disposed of during pig iron production. To solve this problem, the process in accordance with the invention consists essentially in the lime charge fed into the fusion gasifier being preheated, possibly together with a portion of iron ore, in a preheating shaft and calcined and charged according to the cement clinker composition required.

BRIEF DESCRIPTION OF THE DRAWING

The drawing illustrates an embodiment of the present invention.

DETAILED DESCRIPTION OF THE PREFERRED EMBODIMENTS

Through the fact that the lime charge is introduced according to the cement clinker composition required, the parameters necessary for the process in accordance with the invention are determined by the cement clinker quality. The use of slag as cement clinker assumes, as a rule, a fairly high CaO content, and hence the process in accordance with the invention can be applied for the simultaneous production of pig iron and cement clinker with charge material of much lower quality. The crude ore that can be used in accordance with the invention, unlike the usual charge materials in a conventional blast furnace, may have high proportions of $CaO$, $SiO_2$ and $Al_2O_3$, since these substances accompanying the ore represent components for clinker production. Since optimization with regard to improving the quality of the product gas hitherto usual for fusion gasification processes is now also not necessary, an economical procedure can be achieved by taking advantage of the heat balances in each case for clinker production. With the separate preheating of the lime marl, which is possibly mixed with iron ore, the material charged after preheating is first calcined and possibly sintered, when it is possible to use waste heat from the process directly for calcining and possibly sintering. The use of iron ore, and in particular a portion of the iron ore, for the lime charge preheated and calcined in this way leads at the same time to the formation of readily reducible ferrites which improve the iron yield.

In addition to iron ore of inferior quality with relatively high proportions of $MgO$, $CaO$, $SiO_2$ and $Al_2O_3$, the fusion gasifier may be charged with solid or liquid steelworks slag. Various carbon-containing substances, such as oil shale, communal and industrial waste or household refuse may be used at least in partial substitution as carbon and the use of a preheating shaft for the deacidification and preheating of a lime marl permits the adaptation of the lime charge to the required cement clinker composition in a much simpler manner and allows the management of the process with regard to the required cement clinker quality.

In addition to the carbon-carrying substance, a preheated air-oxygen mixture is blown into the fusion gasifier head in a manner which is in itself known, a reduction gas which is composed mainly of carbon monoxide, hydrogen and carbon dioxide resulting from the combustion reaction in addition to melting heat. Since the gasification process does not have to be optimized in the sense of improving the calorific value of the gas produced, relatively much lower temperatures can be used here, since an increased CO fraction is not necessary to the improvement of the calorific value.

Depending on the measuring of the lime charge, a slag melt can be directly obtained which, depending on the required cement composition, is of blast furnace slag, white cement clinker, Portland cement clinker, Ferrari cement clinker, or special clinker quality.

In order to avoid an excessive thermal stress, it may possibly seem necessary not to introduce the lime charge for the production of the required cement clinker quality alone into the fusion gasifier, since a very large lime charge would also result in an increase in the melting temperature of the slag and the slag viscosity. The slag viscosity may indeed be at least partly reduced again by the introduction of appropriate additives, such as $CaF_2$, for example. On the whole, however, an excessively high melting temperature of the slag is not desirable. In these cases the process in accordance with the invention may be applied to advantage in such a way that part of the preheated calcination product is mixed with the fusion gasifier slag, which is tapped off in liquid form, in a clinker plant, so that the required CaO content of the cement clinker required can be established in a reactor separate from the fusion gasifier, namely the clinker plant. A clinker plant of this kind may simply be made up of rotary tubular furnaces, in particular a cascade of such rotary tubular furnaces.

To improve the energy balance and to be able to dispose of contaminants reliably it is possible to proceed within the scope of the invention in such a way that chlorine-containing waste substances, e.g. PCB (polychlorinated biphenyls) laden with dioxins and furans, are blown into the fusion gasifier or the preheating shaft. The chlorine-containing waste substances are thermally decomposed in order to separate chloride in the form of calcium chloride or other compounds in the case of an appropriately large lime charge, as is attempted in accordance with the invention or takes place in the preheating shaft. In addition, such an increased chlorine content, taking into account the relatively high melting temperature of the slag melt, may be used directly to prevent or produce an excessive alkali content in the cement clinker composition. The procedure here may to advantage be to clean the product gas of the fusion gasifier in a hot cyclone, with the condensation of alkali and possibly heavy metal compounds, the cleaned product gas preferably being burned with cooling air from the cooling of the clinker solidifying from the slag and used for the calcination of the charge substance composed of carbonate initial material. In this way the energy balance of the process is greatly improved.

If the cement clinker composition should have too high a content of iron oxide, it may be of advantage in the procedure in accordance with the invention, by reason of the separation into a fusion gasifier process and a process taking place in a clinker plant separate from the fusion gasifier, to reduce the content of iron oxide by reduction in the slag. Here excess iron oxide can to advantage be reduced in the slag, with the separation of an iron bath, such a reduction appearing particularly advantageous if liquid converter slag is added to the molten fusion gasifier slag in a quantity sufficient for the utilization of residual iron. If ore cement clinker is to be prepared without the addition of liquid steelworks slag, it is possible already to prepare the increased iron oxide fraction in the target clinker in the fusion gasifier by only partial reduction of the iron ore (ferrites) introduced.

In order to make optimal use of the considerable sensible and latent heat of the slag in the preparation of cement clinker it is advisable for the cooling of the fusion clinker to take place at temperatures above 1000° C. in a fluidized bed cooler using cooling air, while the possibility of developing the required cement clinker phases, in particular alite and belite, in suitable quantities and at the same time providing a suitable quantity of preheated cooling air for preheating purposes is created on cooling. The process is in this case controlled so that the holding time at temperatures above 1000° C. selected for the formation of the cement phases alite and belite is at least 15 minutes, and preferably 25 to 30 minutes.

With regard to the lower-quality coal that can be used directly in a fusion gasification process or the use of oil shale, ash refuse as a silicate-bearing agent and scrap, when there is a relatively large sulphur fraction a corresponding quantity of sulphide-bound sulphur may occur in the slag. In these cases the process may to advantage be conducted so that sulphide-bound sulphur and calcium carbide are oxidized to $SO_3$ or CaO and $CO_2$ in the clinker plant.

On the whole, through the separation in accordance with the invention of the metallurgical redox operation and the subsequent refining of the slag quality a procedure is obtained with which the process can be optimized, with a simultaneous production of pig iron from lower-quality initial materials and cement clinker. A strongly basic slag, such as is desirable for the preparation of cement clinker, may in principle also be concentrated with iron oxide, it being known that such iron oxides act as a flux in the slag, so that a fusion clinker with an admittedly high content of iron oxide is produced. Such fusion clinkers are known, for example, as Ferrari or ore cements. In the case of such a high iron oxide content in the slag, reduction with carbon to the required iron oxide content may be carried out by a secondary metallurgical process in the still liquid slag in the clinker plant, for example in a second ladle.

On account of the relatively high reduction potential of the iron melt in the fusion gasifier, entrained heavy metal compounds such as those that emanate from the waste materials used, but in particular zinc, lead, copper and nickel, are reduced. In processes of this kind zinc passes into the gas phase, whereas copper and nickel dissolve in the metal bath and lead, in the form of a crude lead alloy, forms a melt phase beneath the iron bath. The undesirable copper here represents the only important limitation to the quantity balance of the waste materials to be introduced, since copper, being harmful to iron, may be contained in the pig iron only in small maximum permissible quantities. Sulphur and chromium normally pass into the slag phase, while metallic aluminum possibly also introduced is burned and also bound in the slag phase.

Fairly large quantities of more highly concentrated waste containing heavy metals may, like excesses of alkali, be expelled by chlorination, part of the combustion and reduction carbon possibly being replaced by waste solvents with contents of chlorine, e.g. trichloroethylene, or else calcium chloride may, for example, be added to the raw material in the preheater or the fusion gasifier.

The cleaning of the product gas from the head of the fusion gasifier may be conducted in a hot cyclone at relatively low temperatures from 800° C. to 1000° C. At such temperatures the alkaline compounds vaporized in the fusion gasifier may be condensed, zinc possibly being oxidized to zinc oxide and possibly also being separated as dust.

The gases may be circulated between the hot cyclone and the fusion gasifier so that concentration to content levels suitable for further use becomes possible.

The product gas drawn off from the hot cyclone may to advantage be burned in the preheating shaft with air preheated in the clinker plant, so that the lime marl may be deacidified and may possibly be made to react with ore, whereby readily reducible ferrite phases are produced. At the same time an extremely efficient waste gas cleaning, and in particular a removal of dust and a removal of residual sulphur, can be achieved with a preheating of this type. Nitric oxides may be broken down in a conventional manner by blowing in ammonia in the temperature range from about 900° C., this taking place in the lower region of the preheating shaft.

The fusion clinker, after appropriate management of the cooling phases with an appropriate holding time at temperatures above 1000° C., may be granulated for the formation of the clinker phases alite and belite, since it is possible to carry out fusion clinker granulation particularly simply by means of a fan blower. The cooling air preheated during the cooling of the fusion clinker may be used to improve the energy balance for the deacidification of the lime marl and the combustion in the fusion gasifier.

The invention is explained below by means of an embodiment, shown in the drawing, of a device suitable for the application of the process in accordance with the invention.

In the drawing the reference 1 relates to a preheating shaft into which lime marl and iron ore 18 are charged. The lime marl charged and the added iron ore first pass in the preheating shaft through a drying zone 20 which is followed by a preheating zone 21. The charge material subsequently passes through a calcining zone 22 and a sintering zone 23 in which calcium ferrites are formed. The energy necessary for the calcination and preheating is obtained in the combustion zone 24 by combustion with preheated air, which is fed in through the line 5, of the product gas from the head 3 of a fusion gasifier 4, this gas having been cleaned in a cyclone 2. From the preheating shaft 1 the material passes by way of a star wheel lock 6 into the fusion gasifier 34, while coal 30, oil shale 30, refuse ash 3, scrap 32 and/or household refuse 33 are blown in with a carrier gas at the head of the fusion gasifier 34 by way of corresponding lines. Refuse scrap 32 is a material that has undergone substantial preliminary reduction, so that in these cases a considerable preliminary reduction of iron ore may be dispensed with and only a portion of the iron ore is added to the lime marl. Taking into account the much higher lime content with regard to the required slag melt composition, however, a considerable proportion of the initial material necessary for raw iron extraction may be introduced together with the lime marl, with the formation of ferrites which are particularly readily reducible.

The reduction of the charge material with the simultaneous application of the melting heat takes place in a coal fluidized bed 7 in the lower region of the fusion gasifier 34. At the foot of the fusion gasifier a raw or pig iron bath 8 collects on which a slag bath 9 floats. The pig iron bath 8, like the slag bath 9, is tapped off at regular intervals, the slag melt being removed to a clinker plant 26 consisting of two rotary tubular furnaces 10 and 11. In the first rotary tubular furnace 10 there is then possibly an addition of calcined lime marl, which is introduced by way of a star wheel lock 12 and line 25. Cooling air 28 is introduced through the second rotary tubular furnace 11, so that the required air cooling with simultaneous preheating of the combustion air 27 used later, as it is recycled by way of the line 5 to the preheating shaft, is ensured.

The product gas from the head 3 of the fusion gasifier 4 is passed through the line 13 to the hot cyclone 2, while the product gas contains, in addition to carbon monoxide and hydrogen, also alkalis and zinc, depending on the addition and composition of the admixtures in the fusion gasifier and in particular on the quantity of chlorine. The cleaned product gas is recycled by way of the line 14 to the combustion zone of the preheating shaft, whereas the solids separated are directed in the circuit and recycled through a line 15 to the coal fluidized bed 7. After an appropriate concentration of usable substances has been obtained in the solids in the circuit, discharge to a disposal unit may take place. A further possibility consists in recycling part of the cleaned cyclone gas to the combustion zone of the fusion gasifier (coal fluidized bed).

The pig iron 29 is passed on to the steelworks through the pig iron discharge aperture 17.

The invention is explained in greater detail below by the following non-limiting example.

EXAMPLE

The following clinker and iron bath composition was obtained by smelting with a charge consisting of pyrite (hematite) and lime marl.

|  | % |
|---|---|
| Clinker | |
| $SiO_2$ | 18.1 |
| $Al_2O_3$ | 8.5 |
| $Fe_2O_3$ | 10.9 |
| CaO | 61.0 |
| MgO | 1.8 |
| $SO_3$ | 3.3 |
| Iron | |
| C | 4.43 |
| Si | 0.05 |
| Mn | 0.12 |
| P | 0.087 |

|  | % |
|---|---|
| S | 0.013 (0.003) |
| Cu | 1.133 (0.073) |

Anthracite was used as the reduction agent and a clinker/pig iron factor of 1 was set.

The cement strength, with the values

| 7 days | 31 N/mm$^2$ |
|---|---|
| 28 days | 42 N/mm$^2$ | could be described as outstanding, while the high early strength in particular seems to be of advantage.

I claim:

1. Process for the preparation of pig iron and cement clinker in a fusion gasifier comprising the steps of:
   preheating a charge. Comprising lime, and optionally iron ore, in a preheater;
   optionally deacidifying the charge;
   optionally subjecting the charge to preliminary reduction;
   calcining the charge to produce a preheated calcination product;
   optionally sintering the calcination product;
   introducing the calcination product into the fusion generator;
   blowing coal into a coal fluidized bed of the fusion generator;
   reducing and melting the calcination product in the coal fluidized bed of the fusion generator to produce slag having an enhanced CaO content;
   tapping off pig iron and the slag in liquid form from the fusion generator; and
   cooling the slag to for the cement clinker.

2. Process in accordance with claim 1, further comprising the steps of mixing part of the preheated calcination product with the slag to further enhance the CaO content of the slag.

3. Process in accordance with claim 1, further comprising the step of blowing chlorine-containing waste substances into the fusion gasifier or the preheater.

4. Process in accordance with claim 1, further comprising the steps of cleaning a product gas of the fusion gasifier in a hot cyclone.

5. Process in accordance with claim 1, further comprising the steps of cleaning a product gas of the fusion gasifier: burning the cleaned product gas with cooling air from the cooling of the cement clinker solidifying from the slag; and using the generated heat for the calcining step.

6. Process in accordance with claim 1, further comprising the step of reducing excess iron oxide in the slag and separating out an iron bath.

7. Process in accordance with claim 1, further comprising the step of adding liquid converter slag to the molten slag in a quantity sufficient to utilize the residual iron.

8. Process in accordance with claim 2, further comprising the step of cooling the slag to produce the cement clinker at temperatures above 1000° C. in a fluidized bed cooler, using cooling air.

9. Process in accordance with claim 8, further comprising holding the slag for 25 to 30 minutes at temperatures above 1000° C. for the formation of the alite and belite cement clinker phases.

10. Process in accordance within claim 2, further comprising the step of oxidizing sulphide-bound sulphur and calcium carbide to $SO_3$ or CaO and $CO_2$ in the clinker plant.

11. Process in accordance with claim 1, further comprising the step of charging oil shale, refuse, scrap, steelworks slag, or dusts in the fusion gasifier with the coal.

12. A process according to claim 1, wherein the charge comprises lime and iron ore.

13. A process according to claim 1, further comprising the step of using waste heat for at least one of the preheating and calcination steps.

14. A process according to claim 2, further comprising the step of supplying the slag and preheated calcination product mixture to a clinker plant comprising rotary furnaces.

15. A process according to claim 3, wherein the chlorine-containing waste substances comprise polychlorinated biphenyls laden with dioxins and furans.

* * * * *